(12) United States Patent
Krom

(10) Patent No.: US 7,721,485 B2
(45) Date of Patent: May 25, 2010

(54) LEECH TRAP

(76) Inventor: Travis Lee Krom, P.O. Box 1202, Belcourt, ND (US) 58316

( * ) Notice: Subject to any disclaimer, the term of this patent is extended or adjusted under 35 U.S.C. 154(b) by 239 days.

(21) Appl. No.: 12/041,714

(22) Filed: Mar. 4, 2008

(65) Prior Publication Data
US 2009/0223113 A1    Sep. 10, 2009

(51) Int. Cl.
*A01K 69/06* (2006.01)
*A01K 69/08* (2006.01)

(52) U.S. Cl. ............ 43/100; 43/55; 43/58; 43/64

(58) Field of Classification Search ............ 43/55, 43/56, 58, 64, 65, 100, 103
See application file for complete search history.

(56) References Cited

U.S. PATENT DOCUMENTS

| | | | | |
|---|---|---|---|---|
| 11,942 A | * | 11/1854 | Myers | 43/58 |
| 311,346 A | * | 1/1885 | McKinney | 43/100 |
| 354,958 A | * | 12/1886 | Weightman | 43/56 |
| 527,435 A | * | 10/1894 | Loud, Jr. | 43/100 |
| 535,966 A | * | 3/1895 | Tufts | 43/65 |
| 616,924 A | * | 1/1899 | Heberling | 43/100 |
| 689,086 A | * | 12/1901 | Inman | 43/100 |
| 769,874 A | * | 9/1904 | Paar | 43/56 |
| 777,382 A | * | 12/1904 | Le Beau | 43/55 |
| 807,875 A | * | 12/1905 | Shinners | 43/56 |
| 816,251 A | * | 3/1906 | Petmecky | 43/100 |
| 844,945 A | * | 2/1907 | Le Beau | 43/100 |
| 893,943 A | * | 7/1908 | Sellman | 43/100 |
| 951,157 A | * | 3/1910 | Todd | 43/100 |
| 951,656 A | * | 3/1910 | Newberry | 43/100 |
| 996,731 A | * | 7/1911 | Searles | 43/56 |
| 1,041,195 A | * | 10/1912 | Thomas | 43/65 |
| D46,993 S | * | 2/1915 | Getz | 43/100 |
| 1,269,623 A | * | 6/1918 | Logsdon | 43/65 |
| 1,373,830 A | * | 4/1921 | Petty | 43/56 |
| 1,419,549 A | * | 6/1922 | Fearnow | 43/56 |
| 1,638,238 A | * | 8/1927 | Brautigam | 43/65 |
| 1,670,039 A | * | 5/1928 | Lewis | 43/100 |
| 1,903,276 A | * | 3/1933 | Yanga | 43/65 |
| 1,941,242 A | * | 12/1933 | Bechtel et al. | 43/65 |
| 2,004,899 A | * | 6/1935 | McSwain | 43/65 |
| 2,023,311 A | * | 12/1935 | Davies | 43/65 |
| 2,055,912 A | * | 9/1936 | Schonger | 43/56 |
| 2,111,959 A | * | 3/1938 | Baxter | 43/100 |
| 2,208,861 A | * | 7/1940 | Smith | 43/56 |
| 2,341,246 A | * | 2/1944 | Stowe | 43/56 |
| 2,361,321 A | * | 10/1944 | Schleier | 43/100 |
| 2,465,812 A | * | 3/1949 | Mohme | 43/100 |
| 2,466,447 A | * | 4/1949 | Leighton | 43/55 |

(Continued)

FOREIGN PATENT DOCUMENTS

FR    2720225 A1 * 12/1995

(Continued)

*Primary Examiner*—Darren W Ark
(74) *Attorney, Agent, or Firm*—Jerod E. Tufte

(57) ABSTRACT

A leech trap consisting of a location marking float and an enclosure having a removable lid and a first plurality of holes through the surface of the enclosure to allow entry of leeches into the enclosure. The lower end of the enclosure is weighted and contains a second plurality of smaller holes for rapid drainage of water without loss of the trapped leeches.

4 Claims, 1 Drawing Sheet

U.S. PATENT DOCUMENTS

| | | | |
|---|---|---|---|
| 2,522,017 A * | 9/1950 | Bergman | 43/100 |
| 2,551,236 A * | 5/1951 | Bergman | 43/100 |
| 2,564,598 A * | 8/1951 | Grimshaw et al. | 43/56 |
| 2,569,833 A * | 10/1951 | Simpson, Sr. | 43/100 |
| 2,572,763 A * | 10/1951 | Robertson | 43/55 |
| 2,573,352 A * | 10/1951 | Nicodemus | 43/55 |
| 2,663,117 A * | 12/1953 | Ederer | 43/100 |
| 2,726,478 A * | 12/1955 | Pullen | 43/100 |
| 2,726,479 A * | 12/1955 | Huse | 43/100 |
| 2,728,163 A * | 12/1955 | Camp | 43/100 |
| 2,736,986 A * | 3/1956 | Goldstein | 43/103 |
| 2,739,409 A * | 3/1956 | Sokolik | 43/55 |
| 2,755,594 A * | 7/1956 | Booth et al. | 43/100 |
| 2,790,266 A * | 4/1957 | Williamson | 43/55 |
| 2,833,080 A * | 5/1958 | Hess et al. | 43/55 |
| 3,002,312 A * | 10/1961 | Barker | 43/100 |
| 3,091,882 A * | 6/1963 | Dudley | 43/56 |
| 3,145,500 A * | 8/1964 | French et al. | 43/56 |
| 3,245,172 A * | 4/1966 | Hawks | 43/55 |
| 3,271,894 A * | 9/1966 | Manno et al. | 43/100 |
| 3,374,770 A * | 3/1968 | Freudenberger | 43/55 |
| 3,510,978 A * | 5/1970 | Murdock | 43/56 |
| 3,674,188 A * | 7/1972 | Anderson | 43/55 |
| 3,841,016 A * | 10/1974 | Silva | 43/100 |
| 3,951,104 A * | 4/1976 | Neff | 43/100 |
| 4,177,601 A * | 12/1979 | Morton | 43/103 |
| 4,221,070 A * | 9/1980 | Swindell | 43/100 |
| 4,237,646 A * | 12/1980 | Mims, III | 43/103 |
| 4,249,277 A * | 2/1981 | Plante | 43/100 |
| 4,411,092 A * | 10/1983 | Lalancette | 43/100 |
| 4,450,647 A * | 5/1984 | Schmidt | 43/55 |
| 4,638,588 A * | 1/1987 | Abadie | 43/103 |
| 4,680,887 A * | 7/1987 | Bergquist | 43/100 |
| 4,890,413 A * | 1/1990 | Nelson et al. | 43/55 |
| 4,905,404 A * | 3/1990 | Pasion et al. | 43/55 |
| 5,131,184 A * | 7/1992 | Harrison | 43/100 |
| 5,329,719 A * | 7/1994 | Holyoak | 43/100 |
| 5,406,741 A * | 4/1995 | Little et al. | 43/65 |
| 5,566,499 A * | 10/1996 | Washecka | 43/100 |
| 5,640,800 A * | 6/1997 | Peterson | 43/100 |
| 5,810,191 A * | 9/1998 | Cornelious | 43/100 |
| 5,845,431 A * | 12/1998 | Waite | 43/100 |
| D420,417 S * | 2/2000 | Daniels | D22/119 |
| 6,105,305 A * | 8/2000 | Edens | 43/55 |
| 6,267,079 B1 * | 7/2001 | Eby | 43/100 |
| 6,442,887 B2 * | 9/2002 | Sanquist | 43/55 |
| 7,017,297 B1 * | 3/2006 | Ward | 43/55 |
| 7,249,435 B1 * | 7/2007 | Tetenes | 43/55 |
| 7,610,716 B2 * | 11/2009 | Philbrook | 43/100 |
| 7,644,535 B2 * | 1/2010 | Sloop | 43/56 |
| 2005/0198892 A1 * | 9/2005 | Lin | 43/100 |
| 2008/0190011 A1 * | 8/2008 | Neal et al. | 43/56 |
| 2008/0250697 A1 * | 10/2008 | Wasnick | 43/56 |
| 2008/0307693 A1 * | 12/2008 | Wessels | 43/55 |
| 2009/0025274 A1 * | 1/2009 | Lail | 43/65 |
| 2009/0119976 A1 * | 5/2009 | Allen | 43/55 |
| 2009/0223114 A1 * | 9/2009 | Obrien et al. | 43/100 |
| 2010/0000142 A1 * | 1/2010 | Thompson et al. | 43/55 |

FOREIGN PATENT DOCUMENTS

| | | | |
|---|---|---|---|
| GB | 2255702 A | * | 11/1992 |
| GB | 2317094 A | * | 3/1998 |
| JP | 2009112198 A | * | 5/2009 |
| WO | WO 9705772 A1 | * | 2/1997 |

* cited by examiner

LEECH TRAP

BACKGROUND OF THE INVENTION

1. Field of the Invention

This invention relates to fishing equipment, and more particularly to unattended leech traps for the capture of live leeches.

2. Description of Related Art

Historically, bait harvesters trapped leeches using coffee cans, burlap sacks, aluminum tubes, or metal folding traps. The harvester would bait one of these traps with frozen fish parts or a piece of liver from a chicken, cow, or pig. A typical technique was to place the baited trap in the water in the early evening, check the trap in the early morning, and rotate the traps between several locations known to produce leeches.

Prior art leech traps have the disadvantage that they corrode or degrade due to the long time they spend underwater. Burlap or other sacks tend to break down over time under water. Metal traps, such as coffee cans or aluminum tubular or folding traps rust or corrode from contact with water. A further disadvantage of prior art leech traps is that it is relatively difficult to remove the trapped leeches from the traps. Leeches readily adhere to cloth sacks. When a metal trap is new, leeches do not readily adhere to the sides or bottom of the trap, however as the trap corrodes the leeches adhere more and more tightly to the surface of the trap.

Known prior art leech traps include U.S. Des. Pat. No. 420,417 to Daniels. The Daniels leech trap structure includes a substantially cylindrical leech trap enclosure perforated by numerous holes. The Daniels leech trap does not disclose a trap having larger holes in the upper portion and smaller holes in the lower portion, nor does it disclose a weighted lower portion to ensure proper orientation during use. The Daniels leech trap also does not disclose or suggest the use of a location marking float to allow unattended use on shore or from a boat.

BRIEF SUMMARY OF THE INVENTION

It is therefore an object of this invention to provide a leech trap that is relatively easy and inexpensive to fabricate and that is constructed of environmentally friendly materials that will not corrode due to extended underwater use.

It is a further object to provide a leech trap that includes a floating marker for easy location of the leech trap and a trap that is weighted so as to maintain proper orientation during use, either on shore or from a boat.

Briefly, these and other objects of the invention are accomplished by providing a novel trap for retaining leeches. The trap has an upper end and a lower end. The upper end has a removable lid covering an opening in the trap. The body of the trap includes two sets of holes through the surface of the trap. The first set of holes perforates the upper end of the trap and each hole has a diameter at least one-quarter inch (0.25"). These holes are sized so as to allow leeches to easily enter the trap. The second set of holes perforates the bottom and perimeter of the lower end of the trap and each of these holes has a diameter less than one-eighth of an inch (0.125"). These holes are sized to allow water to drain from the trap while being too small to allow leeches to pass through. The trap also includes a location marking float and a line attached to the location marking float and the enclosure to allow the location marking float to float on the surface of the water indicating the position of the trap. The bottom of the trap includes a weight, preferably enclosed in a sealed cavity, for purposes of maintaining the proper orientation of the trap during use.

DETAILED DESCRIPTION OF THE INVENTION

Figure 1:
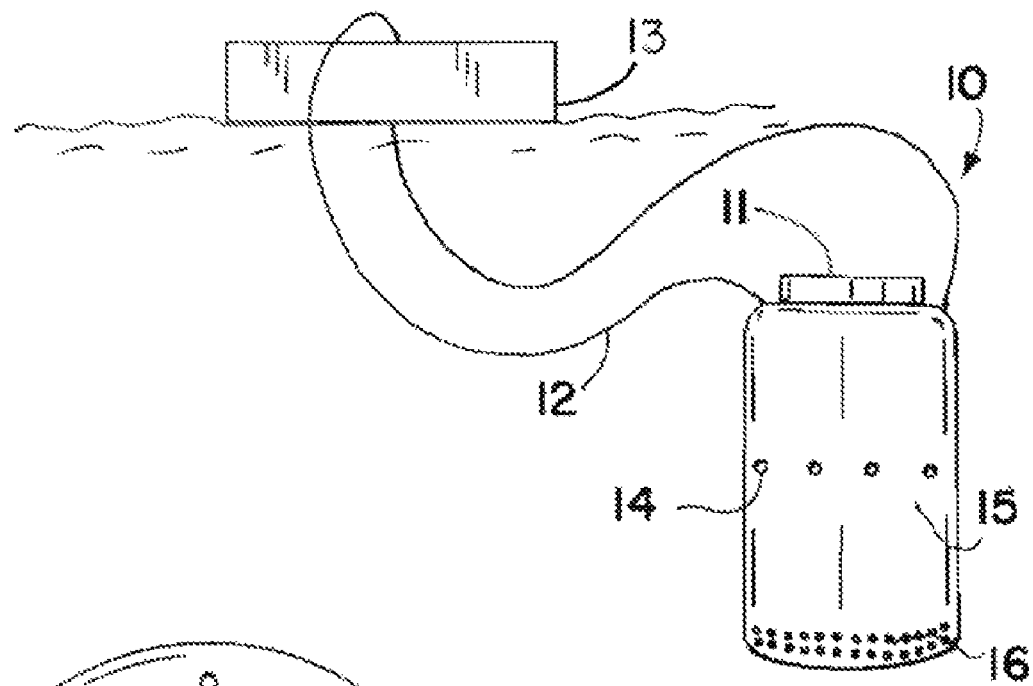
FIG. 1 is a perspective view of the trap structure in accordance with the claimed invention.
Figure 2:
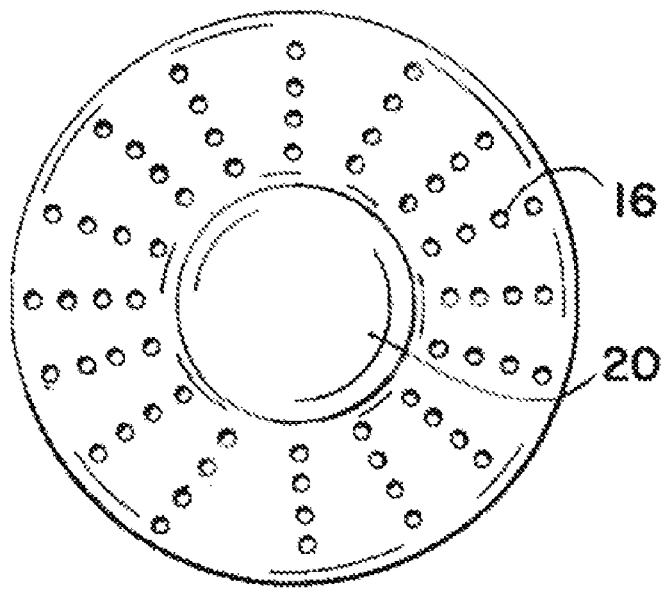
FIG. 2 is a bottom side view of the trap structure in accordance with the claimed invention.

Referring to FIG. 1, there is shown the improved structure of a leech trap 10 comprising a trap enclosure 15, a removable lid 11, a location marking float 13, and a line 12 attached to the enclosure 15 at one end and to the float 13 at the other end. The leech trap 10 can be constructed of environmentally friendly materials that will not corrode due to extended underwater use, and for example, can be constructed of an ultraviolet resistant plastic. The body of the trap enclosure 15 is perforated by two sets of holes, entry holes 14 and drain holes 16. The entry holes 14 are of sufficient diameter to allow leeches to pass through into the trap enclosure 15 and they are positioned in the middle or upper portions of the enclosure 15. As shown in FIGS. 1 and 2 the drain holes 16 perforate the bottom of the enclosure and the lower portion of the sides of the enclosure. The drain holes 16 are of small enough diameter to prevent a typical leech from passing through and exiting the trap.

The entry holes 14 are between one quarter and three quarters of an inch (0.25"-0.75") in diameter. The drain holes 16 are less than one-eighth inch (0.125") in diameter. The preferred hole diameter for best leech entry and retention is one quarter of an inch (0.25") for the entry holes 14 and between one sixteenth and one-eighth of an inch (0.0625"-0.125") for the drain holes 16.

The lid 11 covers an opening in the enclosure 15. The lid 11 may be removed in order to place bait into the trap 10 as well as to remove leeches retained within the trap enclosure 15. The location marking float 13 is attached to the trap enclosure 15 using a line 12. The line 12 is long enough to allow the float 13 to rest on the surface of the water when the enclosure 15 is resting on the bottom of the body of water. The preferred water depth for trapping leeches is from two to five feet, so the line 12 is preferably five or more feet long. The line 12 optionally may be attached to the float 13 by threading it through a hole in the float and attaching both ends of the line to the enclosure 15.

Figure 3:
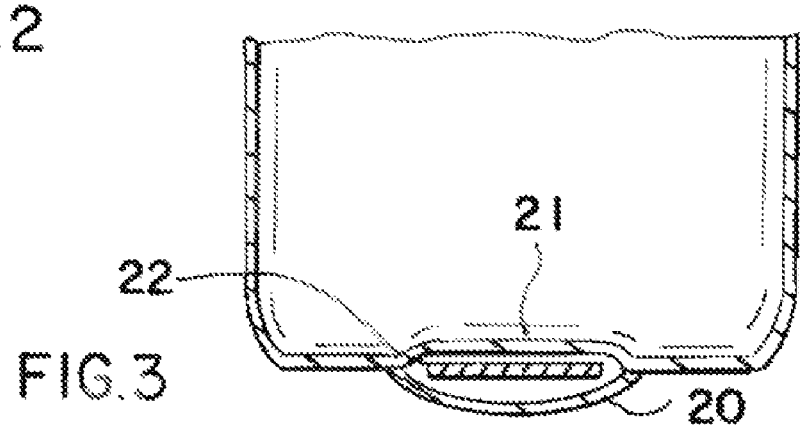
FIG. 3 is a sectional side view of the bottom portion of the trap structure in accordance with the claimed invention.

The leech trap 10 includes a weight 22 attached to the lower end of the enclosure 15. In the preferred embodiment, as shown in FIGS. 2 and 3, the weight 22 is enclosed in a cavity 20 on the bottom surface 21 of the enclosure 15. This configuration is advantageous in that the weight, which may be constructed of any suitably dense material, does not come into contact with the water. This allows the use of weights that may degrade from contact with water or that may pose a risk of pollution, such as weights including lead. Lead weights are frequently used in fishing equipment but lead is increasingly restricted in applications where it may be left in bodies of water, such as shotgun projectiles used for waterfowl hunting.

Method of Use

The embodiment of the invention shown in FIG. 1 and as described above can be used to practice a method of trapping leeches by performing the steps of removing the lid 11 from the enclosure 15, inserting bait into the enclosure 15, securing the lid 11 to the enclosure 15, submerging the enclosure 15 in a body of water having a surface to a depth of from one to five feet with a location marking float 13 attached to the enclosure 15 by a line 12 of sufficient length to allow the location marking float 13 to rest on the surface of the body of water, allowing the enclosure 15 to remain submerged for at least one hour, retrieving the enclosure 15 by raising it to the surface using the line 12 connecting the location marking float 13 and the enclosure 15, and removing any leeches retained in the enclosure 15. The bait employed may be various types of meat, but a particularly effective bait for attracting leeches is the liver of a cow, pig, or chicken. Although, some success trapping leeches may be had by submerging the trap 10 for as little as an hour, greater success may be achieved by submerging the trap 10 in a body of water in the evening and allowing it to remain in the body of water until the next morning. The location marking float 13 provides a convenient way to locate multiple traps 10 that have been left in a body of water unattended over night. The location marking float 13 further provides a convenient location to grasp the line 12 in order to raise the trap 10 to the surface. This method may be practiced from a boat as well as from shore.

Various modifications, substitutions, and changes may be made in the structure and embodiments shown without departing from the concept of the invention. Therefore, the scope of the invention is to be determined by the terminology of the following claims and the legal equivalents thereof.

The invention claimed is:

1. An apparatus for retaining leeches, comprising:
an enclosure having an upper end and a lower end and including a plurality of holes through a surface of the enclosure, said plurality of holes include a first plurality of holes in the upper end each with a diameter at least one-quarter of an inch to three-quarters of an inch and a second plurality of holes in the lower end each with a diameter between one-sixteenth of an inch and one-eighth of an inch;
a removable lid covering an opening in the enclosure;
a location marking float;
a marking line of predetermined length, attached to the location marking float and the enclosure; and
a weight attached to the lower end of the enclosure, wherein the weight is entirely enclosed within a cavity located on the lower end of the enclosure.

2. The apparatus of claim 1, wherein the enclosure is comprised of an ultraviolet resistant plastic.

3. A method of trapping leeches, the method comprising the steps of:
providing the apparatus for retaining leeches of claim 1;
inserting bait into the enclosure;
submerging the enclosure in a body of water to a depth of from one to five feet with the location marking float resting on a surface of the water;
allowing the enclosure to remain submerged for at least one hour;
retrieving the enclosure by raising it to the surface of the water using the line connecting the location marking float and the enclosure; and
removing any leeches retained in the enclosure.

4. The method of claim 3 wherein the bait is beef, pig, deer, or chicken liver.

* * * * *